United States Patent Office 3,265,628
Patented August 9, 1966

3,265,628
URANIUM AND LANTHANIDE ACTIVATED ALKALINE EARTH MOLYBDATE AND TUNGSTATE PHOSPHORS
Marcel J. Vogel, San Jose, Calif., assignor to International Business Machines Corporation, New York, N.Y., a corporation of New York
No Drawing. Filed Mar. 23, 1962, Ser. No. 182,135
7 Claims. (Cl. 252—301.1)

This invention relates to alkaline earth metal phosphors and, more particularly, to the use of lanthanide and uranium ions as activators and sensitizers in alkaline earth metal phosphors.

Alkaline earth tungstates and molybdates are known to be activated by rare earths. Thus, U.S. Patent No. 2,184,274 teaches that samarium oxide causes calcium tungstate to emit in the red. U.S. Patent No. 2,312,268 teaches that strontium tungstates can be activated by uranium to emit in the deep red. Alkaline earth oxides have been sensitized with uranium and rare earths to yield a weak emission.

I have now discovered that a combination of lanthanide and uranium can be utilized to increase perceptibly the emission of the rare earth ion while substantially extinguishing the uranium emission. Apparently, the energy absorbed by the uranium ion in the crystal lattice is transferred to the lanthanide cation and radiated, thereby appreciably increasing the saturation of the color and greatly reducing the emission band spread. The addition of the tungstate enhances the emission of the alkaline earth oxides.

Essentially, the phosphors of the invention are, as indicated before, alkaline earth tungstates and molybdates sensitized with small amounts of a combination of lanthanide and uranium ions. These phosphors are prepared by fusing a uniform mixture of a calcium compound such as calcium oxide or calcium carbonate, i.e., a compound which is an oxide at fusion temperature, with a lanthanide and uranium salt, and then fusing the calcium compound with a tungstate or molybdate oxide or acid to form the desired phosphor.

The alkaline earth compounds which can be used in the preparation of the phosphors of this invention include calcium carbonate, strontium oxide, strontium carbonate, barium tartrate, barium oxide, etc. The acids or oxides of tungsten and molybdenum are used to supply the anion portion of the phosphor molecule. Generally, 1:1 molar ratios of anion to cation suffice to form the phosphors of this invention, though the presence of a slight excess of cation forming alkaline earth compounds is desired.

All the lanthanides are operative in forming the phosphors of this invention. I prefer to use a lanthanide from the group consisting of cerium earths, such as cerium, neodymium, samarium; terbium earths, namely europium, gadolinium, terbium; and dysprosium of the ytterbium earths. Normally, only one hundredth percent of the oxide of each of the uranium and lanthanide metals is needed to form phosphors having optimum light output, though slightly less and considerably more of the sensitizers are operative in forming the phosphors of the invention. These ions can be supplied through use of any heat decomposable salt, such as the nitrates, carbonates, bromides or acetate.

Phosphor compounds can be prepared by mixing an alkaline earth compound, the tungstate or molybdate material, and the sensitizing material and heating the mixture to form the phosphors. However, superior phosphors are prepared by uniformly mixing the sensitizers with an alkaline earth compound, heating the mixture to fuse the sensitizers and the alkaline earth material, mixing the tungstate or molybdate material into the sensitized alkaline earth and heating the resulting mixture to form the desired phosphor.

Mixing can be accomplished by any desired means. The only requirement to the mixing step is that the various materials be uniformly mixed with each other. I prefer to grind the powders to reduce particle size and uniformly mix the particles. This can be done by wetting the powders with $CH_3OH$, grinding in a ball mill and drying out the powder before firing. The temperatures at which the mixtures are heated during the two heating steps are governed by the fusion temperatures of the mixtures. Thus, some mixtures require lower temperatures than do other mixtures. Generally, the alkaline earth sensitizer mixture can be heated from about 1100 to about 1150° C. and the alkaline earth sensitizer tungstate or molybdate mixture can be heated to temperatures on the order of about 50° higher than the first heating temperature. Normally, the mixtures are heated at least about one-half an hour, though where a flux is utilized, the heating period can be reduced by about half. Heating periods on the order of about an hour are generally all that are required to develop an optimum phosphor.

Eutectic forming fluxes may be utilized where the flux forming elements substantially boil from the mixtures prior to cooling the prepared compositions, after the second cooling period. Examples of suitable fluxes include lithium chloride, lithium bromide, and ammonium bromide. About one percent by weight of eutectic forming flux material is added to the raw material mixture. The preferred eutectic flux is lithium bromide.

The following specific examples more fully illustrate my invention. However, it is not intended that my invention be limited to the specific examples shown, the specific concentrations, or firing temperatures. Rather, it is intended that all equivalents obvious to those skilled in the art be included within the scope of my invention as claimed.

The following tables set out a series of experiments showing quantitatively the output of the prior art phosphors and those of this invention. The various ions and compounds were added to the first listed materials in the order shown. The output of the phosphor was determined under 10× magnification from an American Optical Stereo Microscope, coupled to a Photovolt Model 520M Photomultiplier Photometer. The background photometric reading was 8 at a magnification of 10× in a one inch diameter field. Calcium oxide and tungstic acid were added in 1:1 molar ratios and the rare earth and uranium were added as nitrates in 0.01% by weight of the calcium oxide, the percent sensitizer being computed as the metal quantity.

Example I

| | Composition | First Heat, °C. | Approx. Time, Hours | Second Heat, °C. | Approx. Time, Hours | Radiation Output from HBO-200 3,650 A° Excitation | Color Comments |
|---|---|---|---|---|---|---|---|
| 1 | CaO+Eu | | | | | | |
| 2 | (1)* | 1,100 | 1 | | | 170 | Pink. |
| 3 | CaO+Sm | | | | | | |
| 4 | (1) | 1,100 | 1 | | | 250 | Orange-Yellow. |
| 5 | SrO+Eu | | | | | | |
| 6 | (1) | 1,100 | 1 | | | 190 | Red. |
| 7 | SrO+Sm | | | | | | |
| 8 | (1) | 1,100 | 1 | | | 230 | Yellow. |
| 9 | CaO+Eu | | | | | | |
| 10 | (1) (2)** | 1,100 | ½ | | | 135 | Pink. |
| 11 | CaO+Sm | | | | | | |
| 12 | (1) (2) | 1,100 | ½ | | | 190 | Orange-Yellow. |
| 13 | SrO+Eu | | | | | | |
| 14 | (1) (2) | 1,100 | ¼ | | | 165 | Orange-Red. |
| 15 | SrO+Sm | | | | | | |
| 16 | (1) (2) | 1,100 | ¼ | | | 69 | Do. |
| 17 | CaO+U | | | | | | |
| 18 | (1) | 1,100 | 1 | | | 1,300 | Greenish-Yellow. |
| 19 | SrO+U | | | | | | |
| 20 | (1) | 1,100 | 1 | | | 5,100 | Green. |
| 21 | CaO+U | | | | | | |
| 22 | (1) (2) | 850 | ½ | | | 1,400 | Greenish-Yellow. |
| 23 | SrO+U | | | | | | |
| 24 | (1) (2) | 1,100 | ½ | | | 615 | Green. |
| 25 | CaO+U+Eu | | | | | | |
| 26 | (1) | 1,100 | 1 | 1,150 | 1 | 1,100 | Orange-Red. |
| 27 | CaO+U+Sm | | | | | | |
| 28 | (1) | 1,100 | 1 | 1,150 | 1 | 1,100 | Reddish-Orange. |
| 29 | SrO+U+Eu | | | | | | |
| 30 | (1) | 1,100 | 1 | | | 2,300 | Do. |
| 31 | SrO+U+Sm | | | | | | |
| 32 | (1) | 1,100 | 1 | 1,100 | 1 | 4,200 | Do. |
| 33 | CaO+U+Eu | | | | | | |
| 34 | (1) (2) | 1,100 | ½ | | | 1,300 | Orange-Red. |
| 35 | CaO+U+Sm | | | | | | |
| 36 | (1) (2) | 1,100 | ½ | | | 1,100 | Do. |
| 37 | SrO+U+Eu | | | | | | |
| 38 | (1) (2) | 1,100 | ½ | | | 390 | Reddish-Orange. |
| 39 | SrO+U+Sm | | | | | | |
| 40 | (1) (2) | 1,100 | ½ | | | 390 | Orange-Red. |
| 41 | $SrWO_4$+U+Eu | 1,100 | 56⅔ | | | 510 | Pink. |
| 42 | $Eu_2O_3$ | | | | | | 100 | Do. |
| 43 | CaO | | | | | | |
| 44 | (1) | 1,050 | 1 | | | 220 | Bluish-White. |

(1)*=+$H_2WO_4$.
(2)** One percent by weight of the phosphor LiBr was used as a flux.

Example II

The following table sets outs a series of phosphors having the described emission which can be prepared by mixing ten gms. of calcium oxide with 0.01% by weight each of lanthanide series compound and uranium, firing the mixture at 1150° C. for one hour, grinding 25 gms. of tungstic acid into the fired mixture, and heating the resulting mixture to 1200° C. for one hour.

| Alkaline Earth Material | Lanthanide Salt | Emission |
|---|---|---|
| $CaCO_3$ | $Ce(NO_3)_3$ | Orange-Yellow. |
| CaO | $DyBr_3$ | Yellow. |
| $CaCO_3$ | $GdCl_3$ | Do. |
| CaO | $Sm(NO_3)_3$ | Do. |
| $CaCO_3$ | $La(NO_3)_3$ | Blue-White. |
| CaO | $PrBr_3$ | Orange. |

Example III

To obtain a molybdate phosphor, 0.1 mol calcium oxide is mixed with 0.1% each of uranium bromide and europium bromide and fused at about 1150° C. for one hour. The fusion mixture is cooled and mixed with 0.1 mol molybdic acid and heated to about 1200° C. for one hour.

Now, having described my invention, what I claim is:

1. An alkaline earth phosphor selected from the group consisting of:
    calcium tungstate, calcium molybdate, strontium tungstate and strontium molybdate, and
    activated by at least about 0.01%, based on the weight of oxide of the alkaline earth selected, each of uranium and lanthanide metal selected from the group consisting of cerium earths, terbium earths, and dysprosium.

2. An alkaline earth phosphor selected from the group consisting of:
    calcium tungstate, calcium molybdate, strontium tungstate, and strontium molybdate, and
    activated by at least about 0.01% to about 0.1% based on the weight of oxide of the alkaline earth selected, each of uranium and lanthanide metal selected from the group consisting of the cerium earths, terbium earths, and dysprosium.

3. An alkaline earth phosphor selected from the group consisting of:
    calcium tungstate, calcium molybdate, strontium tungstate, and strontium molybdate, and
    activated by at least about 0.01% to about 0.1%, based on the weight of oxide of the alkaline earth selected, each of uranium and europium.

4. An alkaline earth phosphor selected from the group consisting of:
    calcium tungstate, calcium molybdate, strontium tungstate, and
    activated by at least about 0.01% to about 0.1%, based on the weight of oxide of the alkaline earth selected, each of uranium and samarium.

5. The process comprising:
    mixing an alkaline earth compound with a heat decomposable uranium compound and a heat decomposable lanthanide compound, said alkaline earth compound forming an alkaline earth oxide at the fusion temperature of the mixture;
    heating the mixture to a temperature sufficient to fuse the alkaline earth compound, the uranium compound, and the lanthanide compound, and to form the alkaline earth oxide, said uranium and lanthanide compounds being decomposed during the heating;

mixing the fused mixture with a compound which forms a transition metal oxide selected from the group consisting of tungstic oxide and molybdic oxide at the fusion temperature of the mixture; and, heating this mixture to a temperature sufficient to fuse the mixture and to form a phosphor selected from the group consisting of alkaline earth tungstate and alkaline earth molybdate, and activated by at least about 0.01%, based on the weight of said alkaline earth oxide, each of uranium and lanthanide.

6. The process comprising:

mixing an alkaline earth compound with a heat decomposable uranium compound and a heat decomposable lanthanide compound, said alkaline earth compound forming an alkaline earth oxide at the fusion temperature of the mixture, the lanthanide element of said lanthanide compound being selected from the group consisting of the cerium earths, terbium earths and dysprosium;

heating the mixture to a temperature sufficient to fuse the alkaline earth compound, the uranium compound, and the lanthanide compound, and to form the alkaline earth oxide, said uranium and lanthanide compounds being decomposed during the heating;

mixing the fused mixture with a compound which forms a transition metal oxide selected from the group consisting of tungstic oxide and molybdic oxide at the fusion temperature of the mixture; and, heating this mixture to a temperature sufficient to fuse the mixture and to form a phosphor selected from the group consisting of alkaline earth tungstate and alkaline earth molybdate, and activated by at least about 0.01%, based on the weight of said alkaline earth oxide, each of uranium and lanthanide selected from the group consisting of cerium earths, terbium earths, and dysprosium.

7. The process comprising:

mixing an alkaline earth compound with a heat decomposable uranium compound and a heat decomposable lanthanide compound, said alkaline earth compound forming an alkaline earth oxide at the fusion temperature of the mixture, the alkaline earth element of said alkaline earth compound being selected from the group consisting of calcium and strontium, the lanthanide element of said lanthanide compound being selected from the group consisting of cerium earths, terbium earths, and dysprosium;

heating the mixture to a temperature sufficient to fuse the alkaline earth compound, the uranium compound, and the lanthanide compound, and to form the alkaline earth oxide, said uranium and lanthanide compounds being decomposed during the heating;

mixing the fused mixture with a compound which forms a transition metal oxide selected from the group consisting of tungstic oxide and molybdic oxide at the fusion temperature of the mixture; and, heating this mixture to a temperature sufficient to fuse the mixture and to form a phosphor selected from the group consisting of calcium tungstate, strontium tungstate, calcium molybdate, and strontium molybdate, and activated by at least about 0.01% to about 0.1%, based on the weight of said alkaline earth oxide, each of uranium and lanthanide selected from the group consisting of cerium earths, terbium earths, and dysprosium.

References Cited by the Examiner

UNITED STATES PATENTS

| | | | |
|---|---|---|---|
| 2,184,274 | 12/1939 | Fonda | 252—301.5 |
| 2,312,268 | 2/1943 | Roberts | 252—301.5 |
| 2,807,586 | 9/1957 | Moran | 252—301.5 |
| 3,003,112 | 10/1961 | Van Uitert | 252—62.5 |

OTHER REFERENCES

Kroger: "Some Aspects of the Luminescence of Solids," Elsevier Publishing Co., Inc., New York, 1948, pages 152, 290, 291, 293, 294, 295, 297, and 298.

TOBIAS E. LEVOW, *Primary Examiner.*

MAURICE A. BRINDISI, *Examiner.*

R. D. EDMONDS, *Assistant Examiner.*